July 25, 1967 V. J. LUNDELL 3,332,219
MACHINE FOR WAFERING FORAGE CROPS OF VARIABLE MOISTURE CONTENT
Filed Feb. 25, 1965 3 Sheets-Sheet 1

INVENTOR.
VERNON J. LUNDELL
BY
Wolfe, Hubbard, Voit & Osann
ATTORNEYS.

July 25, 1967 V. J. LUNDELL 3,332,219
MACHINE FOR WAFERING FORAGE CROPS OF VARIABLE MOISTURE CONTENT
Filed Feb. 25, 1965 3 Sheets-Sheet 3
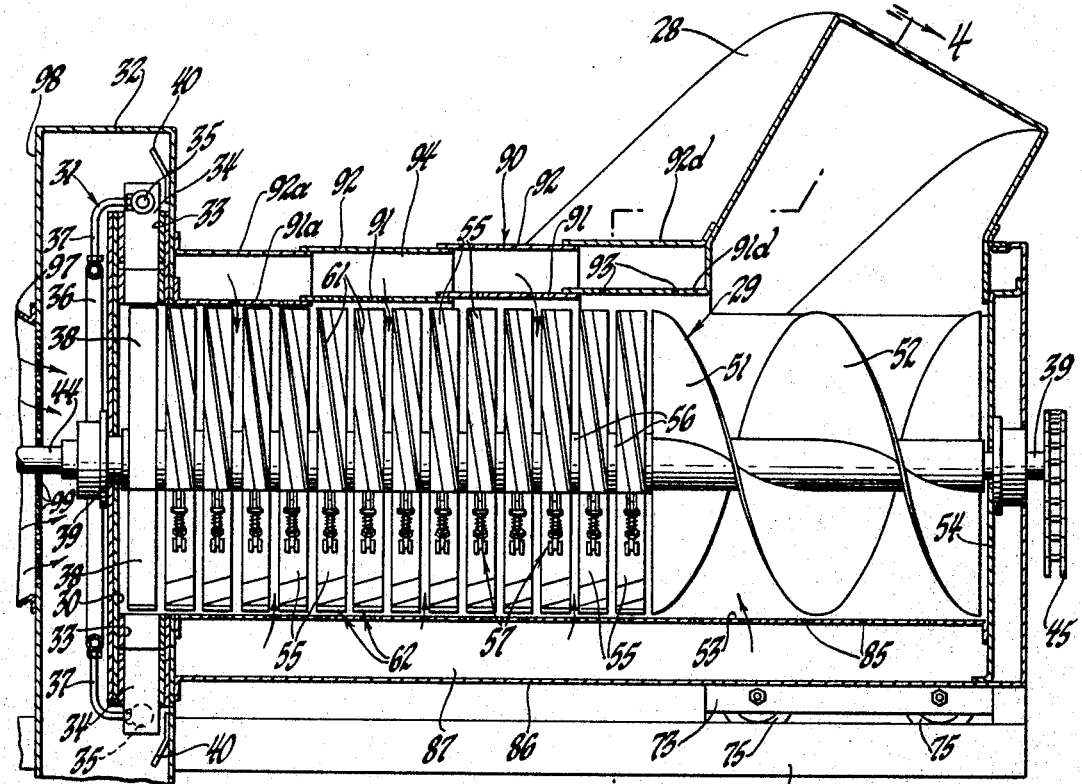
Fig. 3
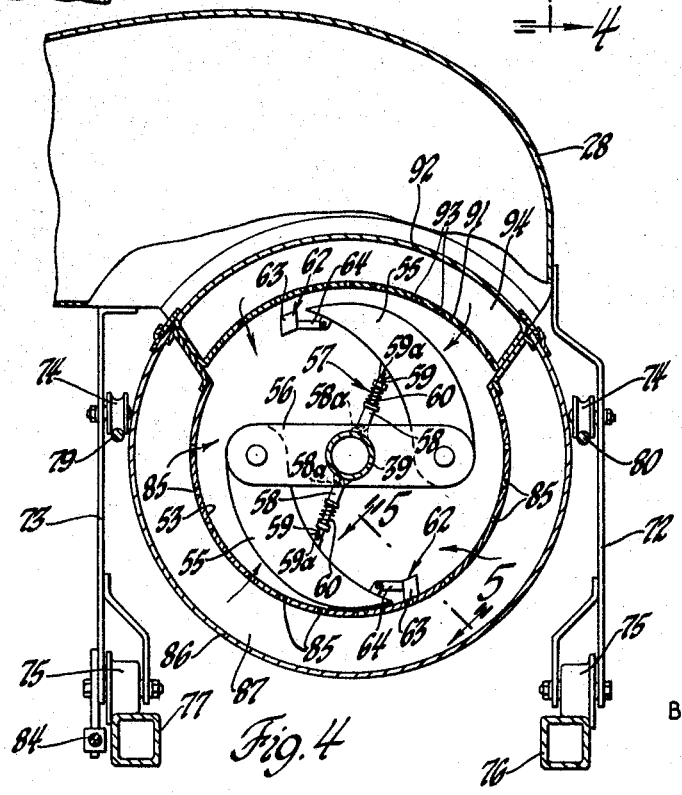
Fig. 4
Fig. 5
INVENTOR.
VERNON J. LUNDELL
BY
Wolfe, Hubbard, Voit & Osann
ATTORNEYS.

United States Patent Office 3,332,219
Patented July 25, 1967

3,332,219
MACHINE FOR WAFERING FORAGE CROPS OF VARIABLE MOISTURE CONTENT
Vernon J. Lundell, Cherokee, Iowa, assignor to Massey-Ferguson Services N.V., Curacao, Netherlands Antilles, a corporation of the Netherlands Antilles
Filed Feb. 25, 1965, Ser. No. 435,240
16 Claims. (Cl. 56—1)

The present invention relates generally to forage harvesting machines and more particularly concerns machines for wafering forage crop material.

In recent years various types of machines have been developed for wafering forage crop material. While the general utility of these machines has been widely recognized, their practicability has been greatly hampered due to their ability to produce satisfactory wafers in only a narrow range of widely varying operating conditions. One of the most critical operating parameters influencing the production of high quality wafers has, in the past, been the moisture content of the forage crop material. If the moisture content is either too high or too low, the forage crop material does not properly compress into well formed wafers.

Furthermore, both the pre-wafering and post-wafering mechanisms of the machine often must be altered in these circumstances to compensate for the desired input and discharge of the forage crop material from the wafering chamber when the moisture content of the material is not within the optimum operating range.

Accordingly, the broad objective of the present invention is to provide an improved forage wafering machine which is capable of producing satisfactory wafers from forage crop material which may vary widely in moisture content.

It is a more specific object of the invention to provide a forage wafering machine with means for lacerating and shredding the forage crop material prior to the wafering operation in order to free the excess moisture and juices from the material.

It is a further object to provide a machine of the above type with means for varying the period in which the forage crop material is subjected to the lacerating and shredding operation in order to accommodate material of widely varying moisture content without unnecessarily shattering and pulverizing the material.

An additional object of the present invention is to provide means for directing heated air on the forage crop material during the lacerating and shredding operation so as to facilitate the evaporation of the moisture and juices freed from the material.

Yet another object of the invention is to provide a forage wafering machine of the type described above with means for directing heated air on the compacted wafers of forage crop material to facilitate the drying and evaporation of excess moisture formed on the wafers during the compaction of the forage crop material.

Other objects and advantages of the invention will become more readily apparent upon reading the following detailed description and upon reference to the drawings, in which:

FIG. 3 is an enlarged fragmentary cross section taken through the wafering chamber and conveyor trough of the machine;

FIG. 4 is a fragmentary section taken generally along lines 4—4 in FIG. 3; and

FIG. 5 is a further enlarged fragmentary view of a portion of the apparatus as seen generally along line 5—5 in FIG. 4.

While the invention is illustrated and described in connection with a particular embodiment, is is not thereby intended that the invention be limited thereto. On the contrary, it is intended to include all alternative constructions and modifications falling within the spirit and scope of the invention as expressed in the appended claims.

Figure 1:
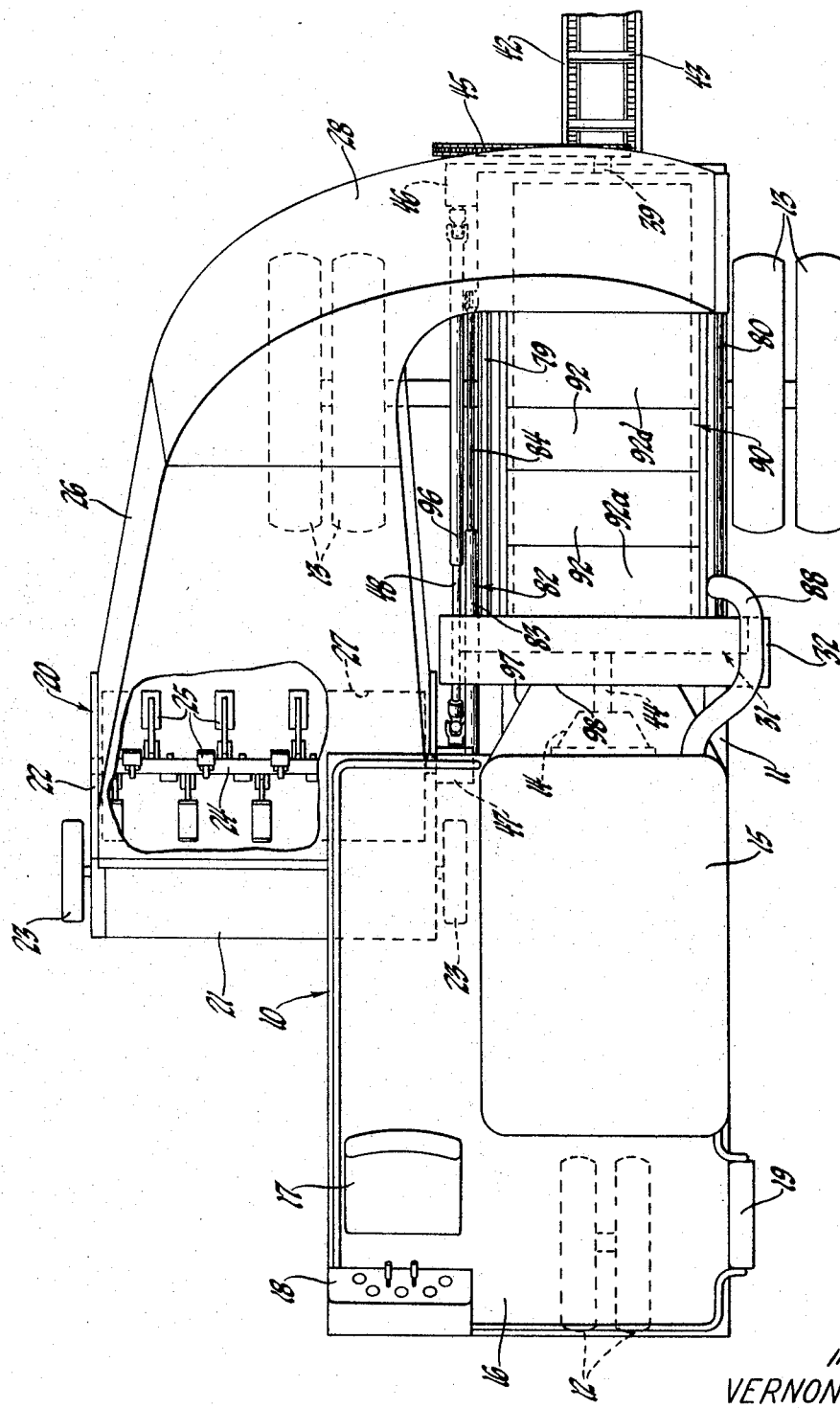
FIGURE 1 is a top plan view of a forage wafering machine embodying the present invention with certain portions broken away for illustrative purposes.

Turning now to the drawings, there is shown in FIGURE 1, an illustrative forage wafering machine 10 which embodies the features of the present invention. As illustrated, the machine 10 is of the self-propelled type having a main frame or chassis 11 supported by steerable front wheels 12 and rear drive wheels 13. A motor 14 enclosed in a housing 15 is mounted on the frame 11 for driving the rear wheels 13 through a suitable drive shaft and transmission (not shown). An operator's platform 16 is disposed at the front end of the machine with an operator's seat 17 and a control console 18 mounted on the chassis 11 so as to afford the machine operator with good visibility while operating the machine. A ladder 19 affords convenient access to the operator's platform 16.

For initially cutting and comminuting the forage crop material, the machine 10 is provided with a rotary-flail type pickup unit, indicated generally at 20. In the present instance the pickup unit 20 includes a forwardly projecting apron 21 mounted on a subframe 22 which journals a pair of vertically adjustable support wheels 23. The subframe 22 also journals a flail shaft 24 on which a plurality of pivotally mounted flail blades 25 are secured. As will be understood by those familiar with this art, the flail blades 25 not only cut and comminute the standing or previously windrowed forage crop material as the flail shaft 24 rotates, but also, the forage material is lifted and the commingled leaves and stems are pitched upwardly and rearwardly by the rapidly rotating blades.

To receive the chopped forage crop material from the rotary flail 20, a delivery chute 26 is connected to the subframe 22 with the entrance opening 27 of the chute closely surrounding the rotating flail blades. In the illustrative machine 10 the delivery chute 26 extends upwardly and rearwardly from the rotary flail 20 and is provided with a laterally and downwardly curved hood 28 at its upper end. The curved hood 28 of the delivery chute 26 is adapted to discharge the chopped forage material into a conveyor mechanism 29 (see FIG. 3), the details of which will be discussed at a later point.

From the conveyor mechanism 29 the chopped forage crop material is delivered to a chamber 30 within a wafering mechanism 31 enclosed within a housing 32. In the illustrative embodiment, the wafering mechanism 31 is of the radial type with an annular array of die cells 33 having movable wall portions 34 adapted to restrict the flow of forage material and thus control the density of the compressed wafers. As shown in FIG. 3, a plurality of hydraulic actuators 35 are provided for moving the wall portions 34 with a ring type manifold 36 supplying fluid to and interconnecting the actuators 35 through individual branch lines 37. Within the wafering chamber 30, there is located a compressor mechanism 38, the details of which have not been shown, secured to a shaft 39 journalled for rotation within the chamber 30 so as to distribute the forage crop material about the inner periphery of the die cells 33 and compress the material into and through the cells. A deflector plate 40 is located outwardly of each of the die cells so as to break the compressed forage material being extruded from the cells into discrete wafers which then fall outwardly and downwardly in the housing 32.

Below the housing 32 a conveyor 41 is located to receive the wafers through an opening (not shown) in the bottom of the housing. The conveyor 41 extends rearwardly from the housing 32 and is connected to an upwardly inclined elevator 42 which may be arranged to deposit the wafers into a suitable receptacle such as a trailing wagon (not shown). Both the conveyor 41 and elevator 42 in the present instance are of the drag chain type as indicated at 43.

Power for the wafering mechanism 31 and the rotary flail 20 is provided by a drive shaft 44 coupled to the motor 14. As shown in FIG. 3, the drive shaft 44 is connected directly to the shaft 39 which is journalled in the wafering chamber 30. The shaft 39, in turn, drives the flail shaft 24, through a suitable drive chain 45, gear boxes 46 and 47 and an intermediate shaft 48. The gear boxes 46, 47, of course, are constructed with input and output ratios such that the rotary flail is driven at the desired speed relative to the wafering mechanism.

In accordance with the present invention means are provided for shredding and lacerating the forage crop material received from the hood 28 prior to entry of the material into the wafering chamber 30. In the illustrative embodiment the novel shedding and lacerating means are operated in conjunction with and actually form a part of the conveyor mechanism 29.

As shown in FIGS. 3 and 4, the conveyor 29 includes a pair of auger flights 51 and 52 which are wound on the shaft 39 so as to move the forage crop material along a trough 53 leading into the wafering chamber 30. Preferably, the trough 53 is formed with a generally arcuate cross section and is closed at the end remote from the wafering chamber 30 by a rigid end wall 54.

For shredding and lacerating the forage crop material in the illustrative machine, a plurality of compressor skids 55 are mounted for rotation with the shaft 39 in the conveyor trough 53. In the preferred embodiment, the compressor skids 55 are each pivotally mounted between the ends of axially spaced pairs of adjacent support arms 56 secured to the shaft 39 and extending radially outwardly in opposite directions therefrom. Accordingly, as the shaft 39 rotates, the compressor skids sweep around and around within the trough 53 pressing the forage crop material against the trough thereby shredding and lacerating the crop material and freeing the internal moisture and juices therefrom. As shown in FIG. 4, the compressor skids 55 have a generally arcuate shape and in their operative positions define a plurality of wedge-like compressing spaces with the trough 53 as the skids are centrifugally urged outwardly with respect to the rotating shaft 39.

In the illustrative machine, means are provided for normally maintaining the skids 55 in an extended operative position within the trough 53. As shown, this means includes a spring-biased arm 57 interposed between the shaft 39 and each of the skids 55. Each of the arms 57 is formed of a pair of links 58 and 59, the outer ends of which are respectively pivoted at 58a and 59a, to the shaft 39 and to one of the skids 55. The links 58, 59 are normally maintained in alignment by an expansion spring 60.

Provision is also made for overload release of the skids 55 to minimize damage that might occur if an obstruction or an excess accumulation of crop material is encountered. Further, the construction and arrangement is such that a skid is maintained in released position until the obstruction is cleared and the skid is repositioned. To this end, the connection between the links 58 and 59 of each of the arms 57 is arranged to jackknife if more than ordinary axial movement occurs between these links. For further details concerning the construction and operation of the regulating arms 57, reference may be had to applicant's copending application, Ser. No. 282,625, filed May 23, 1963.

As previously mentioned, the skids 55 form a part of the conveyor mechanism 29. Indeed, each of the compressor skids in the illustrative machine is formed with an outer rib portion 61 which is angled slightly from adjacent the support arms 56 to the free end of the skid in a direction toward the wafering chamber 30. In this way the skids 55 not only compress the crop material against the surface of the trough 53, but also, operate to move the crop material toward the wafering chamber 30 as the shaft 39 is rotated.

To prevent the forage crop material which is compressed by the skids 55 from adhering to the trough 53, each of the skids 55 is provided with an auxiliary scraper shoe 62, in the illustrative example. As best seen in FIGS. 4 and 5, each of the scraper shoes is formed with a substantially flat blade portion 63 which is pivotally mounted in trailing relationship to the skid 55 by means of a short leg member 64. Desirably, the blade portion 63 is angularly disposed with respect to the trough 53 so that the scraper shoe not only frees the compressed crop material from the trough, but also, assists the skids 55 in conveying crop material toward the wafering chamber 30.

In order to accommodate forage crop material of varying moisture content, provision is made in the illustrative arrangement to regulate the period that the crop material is subjected to the compressing and lacerating action of the skids 55. In the present instance, this regulation is accomplished by varying the distance from the wafering chamber that the forage crop material is introduced to the conveyor mechanism 29 and compressor skids 55. When the forage crop material being harvested is of relatively high moisture content it is desirable to introduce the crop material to the conveyor mechanism adjacent the auger flights 51, 52 so as to subject the crop material to the compressing and lacerating action of the skids 55 for a maximum period of time. On the other hand, when the forage crop material is of relatively low moisture content, the period of subjecting the crop material to the compressing action of the skids 55 need be only for a short interval and thus the crop material is desirably introduced to the conveyor mechanism 29 at a point closer to the wafering chamber 30.

To permit the selection of the period of time in which the crop material is subjected to the action of the compressor skids in accordance with the relative moisture content of the crop material, the illustrative mechanism is provided with means for adjusting the position of the curved hood 28 of the delivery chute 26 with respect to the wafering chamber 30. As best seen in FIGS. 3 and 4, the curved hood 28 is supported by means of a pair of depending legs 72 and 73 each of which mounts two pairs of rail engaging wheels 74 and 75. The rail engaging wheels 75 journalled at the lower ends of the legs 72, 73 serve as the principal support for the curved hood 28 by riding on the rails 76 and 77. Similarly, the rail engaging wheels 74 which are journalled at the upper portion of the support legs serve principally to guide the hood 28 on smaller guide rails 79 and 80. Movement of the curved hood 28 toward and away from the wafering chamber 30 is controlled by a hydraulic actuator 82. The hydraulic actuator 82 comprises a cylinder portion 83 secured to the machine chassis 11 and an operating rod 84 coupled to one of the support legs 72. Desirably, the operation of the hydraulic actuator 82 is controlled by the machine operator through suitable manipulation of a control lever at the control console 18.

In further keeping with the present invention, the illustrative machine 10 is provided with means for directing heated air on the forage crop material in the trough 53 so as to assist the evaporation of the moisture freed from the crop material by the lacerating action of the compressor skids 55. To this end, the trough 53 is desirably formed with a plurality of apertures 85 through which the heated air may be directed into the material being conveyed into the wafering mechanism 31 by the conveyor 29. As best seen in FIGS. 3 and 4 a general arcuately shaped wall 86 surrounds the trough 53 in spaced relationship so as to define a passageway 87 for the heated air. The heated air is directed to the passageway 87 by means of a conduit 88 connected at its other end to the motor housing 15. It will be appreciated, of course, that suitable means such as a fan, for example, may be enclosed within the housing 15 for blowing the air heated by the motor 14 through the conduit 88 and into the passageway 87.

Figure 2:
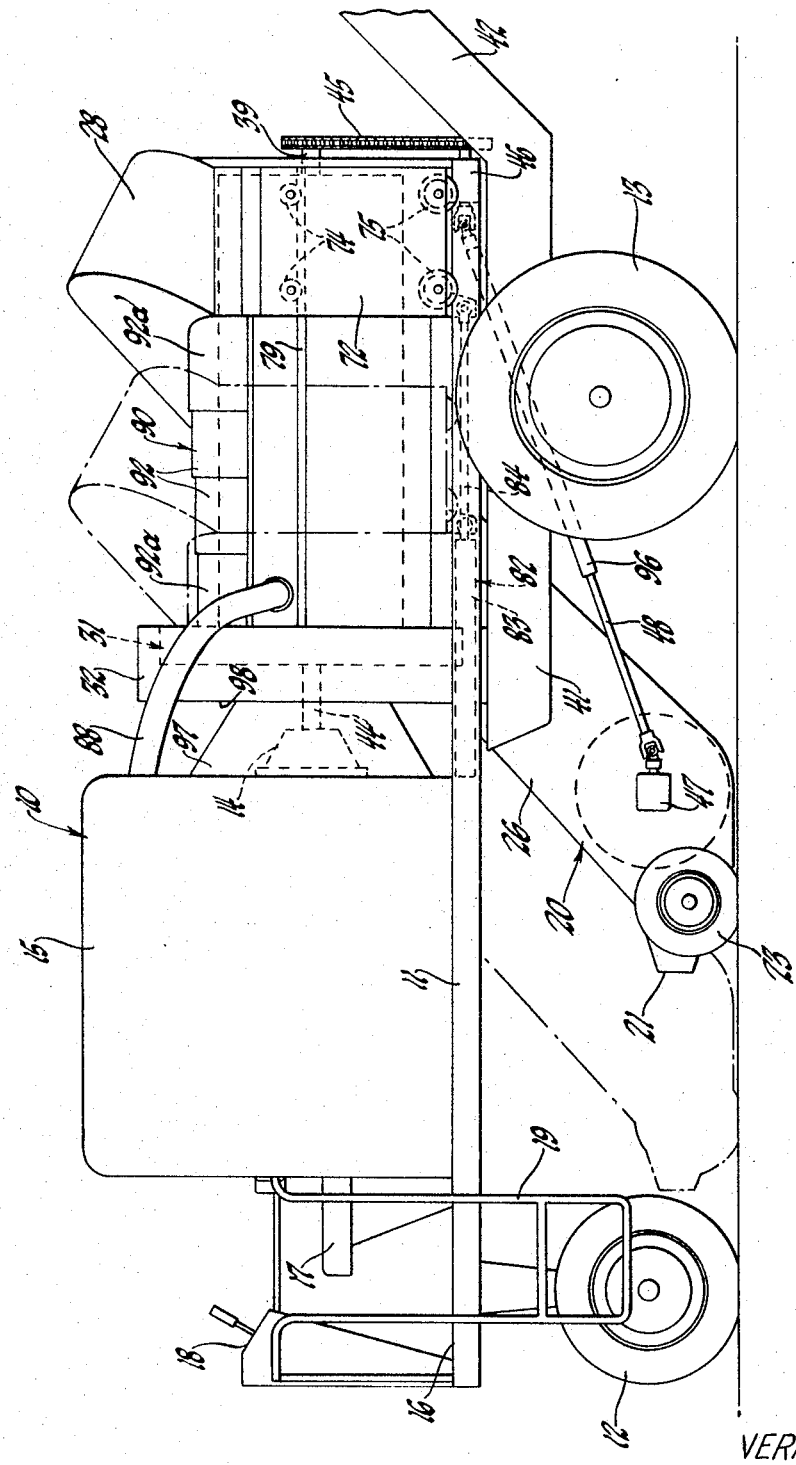
FIG. 2 is a side elevational view of the machine illustrated in FIG. 1 with dot-dash lines illustrating the extreme alternate position of the pickup unit and delivery chute, also shown in full line representations.

Pursuant to this aspect of the invention it will also be understood that the period of time that the forage material in the trough 53 is subjected to the drying action of the heated air is also dependent upon the relative point at which the crop material is delivered into the conveyor mechanism 29. In other words, when the curved hood 28 is moved to the left as seen in FIG. 2 the crop material is subjected to both the lacerating action of the compressor skids 55 and the evaporating action of the heated air for a lesser period than when the actuator 82 is actuated so as to shift the curved hood 28 to the right. Since the evaporating action of the heated air and the lacerating action of the compressor skids 55 are cumulative in nature, forage crop material having a wide range of moisture content can be handled by the illustrative machine simply by shifting the position of the arcuate hood 28.

Additional evaporating action is achieved in the illustrative device by providing a substantially arcuate shaped cover indicated generally at 90 which overlies the trough 53. The cover 90 is preferably of multipart construction with a plurality of inner sections 91 and a plurality of outer sections 92 spaced outwardly therefrom. Each of the inner sections is also provided with a plurality of apertures 93 through which heated air may be directed to evaporate the moisture which is freed from the crop material by the compressing action of the rotating skids 55. The outer sections 92 overlie the inner sections 91 of the cover 90 in such a manner as to define a channel 94 through which the heated air is delivered.

To accommodate movements of the curved hood 28 toward and away from the wafering chamber 30 both the inner and outer sections 91, 92 and the arcuate cover 90 are adapted to telescope together when the hood 28 is drawn toward the wafering chamber 30 by the hydraulic actuator 82. As in the case of the trough 53, of course, the amount of heated air that passes through the apertures 93 of the inner sections 91 of the cover 90 is dependent upon the position of the arcuate hood 28.

In the illustrative machine 10, sections 91a and 92a of the cover 90 adjacent the wafering chamber 30 are simply arcuate continuations of the trough 53 and the spaced wall 86, respectively, which are rigid with the housing 32 of the wafering chamber. Thus, a portion of the heated air from the engine housing 15 that is directed to the passageway 87 by the conduit 88 also flows into the upper passageway or channel 94. Sections 91d and 92d of the cover adjacent the curved hood 28 are rigidly secured thereto and as the hood is moved toward the wafering chamber 30, the end sections 91a, 92a and 91d, 92d and the intermediate sections 91, 92 telescope together in nested relationship.

Referring now to FIG. 2, the remote position of the hood 28 is shown in solid lines and the position of the curved hood adjacent the wafering chamber 30 is shown in dot-dash lines. It will also be noted that since the hood 28 is rigid with the delivery chute 26, movement of the hood toward and away from the wafering chamber also results in simultaneous movement of the delivery chute 26 as well as the pickup unit 20. For this reason, the intermediate shaft 48 which drives the rotary flail shaft 24 is desirably provided with a telescopic section indicated generally at 96.

It is another feature of the present invention that waste engine heat from the motor housing 15 is also utilized to assist the evaporation of the surface moisture from the wafers of forage crop material as they emerge from the die cells 33. To this end, the motor housing 15 in the illustrative machine is formed with a tapered neck portion 97 which is secured to the outer wall 98 of the housing 32 of the wafering mechanism 29. A plurality of apertures 99 are formed in the wall 98 to allow passage of the heated air into the housing 32 so as to assist in evaporating the moisture formed on the surface of the wafers incident to the wafering operation.

From the foregoing it will be appreciated that the illustrative machine 10 is capable of satisfactorily wafering forage crop material that varies widely in moisture content. The novel arrangement of the compressor skids 55 serves to compress and lacerate the forage crop material and free the internal juice and moisture therefrom prior to entry of the material into the wafering chamber. This freed moisture is also subjected to the evaporating action of the heated air collected from the engine housing and directed by the passageways 87, 94 through the apertures 85, 93 into the conveyor trough 53. Moreover, the period of time that the crop material in the trough 53 is subjected to the compressing and lacerating action as well as the evaporating action is controlled by selecting the point at which the crop material is delivered to the trough. In the present instance this is regulated by moving the curved delivery hood 28 toward and away from the wafering chamber. The present invention also provides for assisting the evaporation of surface moisture from the freshly formed wafers by directing waste engine heat into the housing 32 that encloses the wafering mechanism.

I claim as my invention:

1. In a machine for wafering forage crop material, the combination comprising, means for chopping and comminuting the forage crop material, means including a delivery chute for receiving the forage crop material from said chopping and comminuting means, a wafering chamber, a trough extending between said delivery chute and said wafering chamber, means for conveying the forage crop material in said trough from said delivery chute to said wafering chamber, and a plurality of compressor skids disposed for engagement with the forage crop material in said trough for lacerating and further comminuting the forage crop material prior to entry into said wafering chamber.

2. The combination defined in claim 1 wherein said delivery chute is movable along said trough relative to said wafering chamber in order to regulate the period of engagement of the forage crop material by said compressor skids.

3. The combination defined in claim 1 wherein said trough is formed with a plurality of apertures therein and means are provided for directing heated air through said apertures and into the forage crop material in said trough to facilitate drying the forage crop material.

4. The combination defined in claim 1 wherein said trough is formed with a generally arcuate cross section, said conveyor means includes a helical auger flight wound on a shaft rotatable in said arcuate trough and said compressor skids are mounted on said shaft for rotation therewith so as to engage the forage crop material against said arcuate trough.

5. The combination defined in claim 4 wherein said shaft mounts a plurality of axially spaced arms with one of said compressor skids pivotally mounted at each end of said arms and means are provided interconnecting each of said skids and said shaft to limit the outward movement of said skids due to centrifugal force as said shaft is rotated.

6. The combination defined in claim 4 wherein each of said compressor skids is formed with an inclined engaging surface and said engaging surface at the trailing end of said skid is disposed closer to said wafering chamber than said engaging surface at the forward end of said skid whereby rotation of said skids with said shaft also moves the forage crop material in said trough toward said wafering chamber.

7. The combination defined in claim 6 wherein each of said compressor skids carries a pivotally mounted scraper shoe adjacent the trailing end thereof, and said scraper shoe is formed with an inclined face portion adapted to impart an axial force component to the forage crop material so as to move the forage crop material in said trough toward said wafering chamber.

8. The combination defined in claim 4 wherein said wafering chamber encloses means for wafering the forage crop material and the wafering means is disposed coaxially with said auger and said shaft and said shaft is drivingly coupled with said wafering means whereby said conveyor means and said wafering means are operated in consonance to insure delivery of the forage crop material into said wafering chamber in timed relation with said wafering means.

9. The combination defined in claim 2 wherein said wafering chamber is enclosed within a housing, and a multipart telescopic cover is disposed to cover said trough and enclose said conveying means and compressor skids between said chute and said housing, said cover having one part secured to said housing and another part secured to said chute for movement therewith relative to said one part and said housing.

10. The combination defined in claim 9 wherein said trough and said multipart cover are each formed with spaced apart inner and outer arcuate shaped members, said inner members each being formed with a plurality of apertures therein, said outer members being disposed with respect to said inner members to define a passageway therebetween, and means for directing heated air into said passageways and through said apertures to facilitate drying the forage crop material in said trough.

11. The combination defined in claim 9 wherein said housing is formed with an outer wall having a plurality of apertures formed therein, and means are provided for directing heated air through said apertures in said outer wall to facilitate drying the wafers emerging from said wafering chamber into said housing.

12. The combination defined in claim 2 wherein a rail structure is provided adjacent the periphery of said trough and said chute is provided with a supporting frame having rail engaging wheels journalled thereon for movement on said rail structure.

13. In a machine for wafering forage crop material the combination comprising, pickup means including a rotary flail for chopping and comminuting the forage crop material, means including a delivery chute for receiving the forage crop material from said rotary flail, a wafering mechanism disposed within a housing into which compressed wafers are received from said wafering mechanism, an arcuate trough extending between said delivery chute and said wafering chamber, a shaft journalled for roation in said trough, an auger flight secured to said shaft and disposed in a portion of said trough adjacent said delivery chute for conveying the forage crop material from said delivery chute toward said wafering chamber, said shaft having a plurality of radially extending arms fixed thereon between said auger flight and said wafering chamber, and a plurality of compressor skids pivotally mounted on the outer ends of said arms, said compressor skids having a generally arcuate shape and adapted to lacerate and squeeze the forage crop material against said trough as said shaft rotates, and said compressor skids being further formed with an inclined surface portion so as to move the forage crop material from said auger flight toward said wafering chamber.

14. The combination defined in claim 13 including a rail structure disposed adjacent each side of said trough and longitudinally aligned therewith, a supporting frame secured to said delivery chute, said frame having rail engaging wheels journalled thereon for movement on said rail structure whereby said delivery chute is movable along said trough relative to said wafering chamber in order to regulate the period of engagement of the forage crop by said compressor skids.

15. The combination defined in claim 13 including a multipart telescopic cover having a generally arcuate cross section disposed to cover said trough and enclose said compressor skids between said chute and said housing, said cover having one part secured to said housing and another part secured to said chute for movement therewith relative to said one part and said housing with intermediate parts of said cover adapted to nest together when said chute is moved toward said housing.

16. The combination defined in claim 15 wherein said housing is formed with an outer wall having a plurality of apertures formed therein, said trough and said multipart cover are each formed with spaced apart inner and outer arcuate shaped members, said inner members each being formed with a plurality of apertures therein, said outer members being disposed with respect to said inner members to define a passageway therebetween, and means for directing heated air into said passageways and through said apertures to facilitate drying the forage crop material in said trough.

References Cited
UNITED STATES PATENTS

| | | | |
|---|---|---|---|
| 3,174,441 | 3/1965 | Lundell | 107—14 |
| 3,192,881 | 7/1965 | Lundell | 56—1 |
| 3,279,396 | 10/1966 | Soteropulos | 107—14 |

ABRAHAM G. STONE, *Primary Examiner.*

ANTONIO F. GUIDA, *Examiner.*